United States Patent [19]

Hohenstatt

[11] Patent Number: 4,845,984
[45] Date of Patent: Jul. 11, 1989

[54] TEMPERATURE COMPENSATION FOR A THERMAL MASS FLOW METER

[75] Inventor: Martin Hohenstatt, Hammersbach, Fed. Rep. of Germany

[73] Assignee: Degussa Aktiengesellschaft, Frankfurt am Main, Fed. Rep. of Germany

[21] Appl. No.: 144,941

[22] Filed: Jan. 15, 1988

[30] Foreign Application Priority Data

Jan. 29, 1987 [DE] Fed. Rep. of Germany ....... 3702623

[51] Int. Cl.$^4$ ............................................. G01F 1/68
[52] U.S. Cl. .................. 73/204.15; 73/204.19
[58] Field of Search ................. 73/118.2, 204, 204.15, 73/204.19

[56] References Cited

U.S. PATENT DOCUMENTS

| | | | |
|---|---|---|---|
| 4,245,502 | 1/1981 | Eiermann et al. | 73/204 |
| 4,343,183 | 8/1982 | Plapp | 73/204 |
| 4,417,471 | 11/1983 | Kawai et al. | 73/204 |
| 4,474,058 | 10/1984 | Drews et al. | 73/204 X |
| 4,688,424 | 8/1987 | Handtmann | 73/204 |

*Primary Examiner*—Herbert Goldstein
*Attorney, Agent, or Firm*—Cushman, Darby & Cushman

[57] ABSTRACT

For temperature compensation in a thermal mass flow meter with heated and unheated electric resistors which are interlocked to a bridge, a variable temperature-independent electric resistor is connected in parallel to the bridge. The sum of the current through the bridge and of the current through the resistor connected in parallel to the bridge functions as measuring signal.

2 Claims, 1 Drawing Sheet

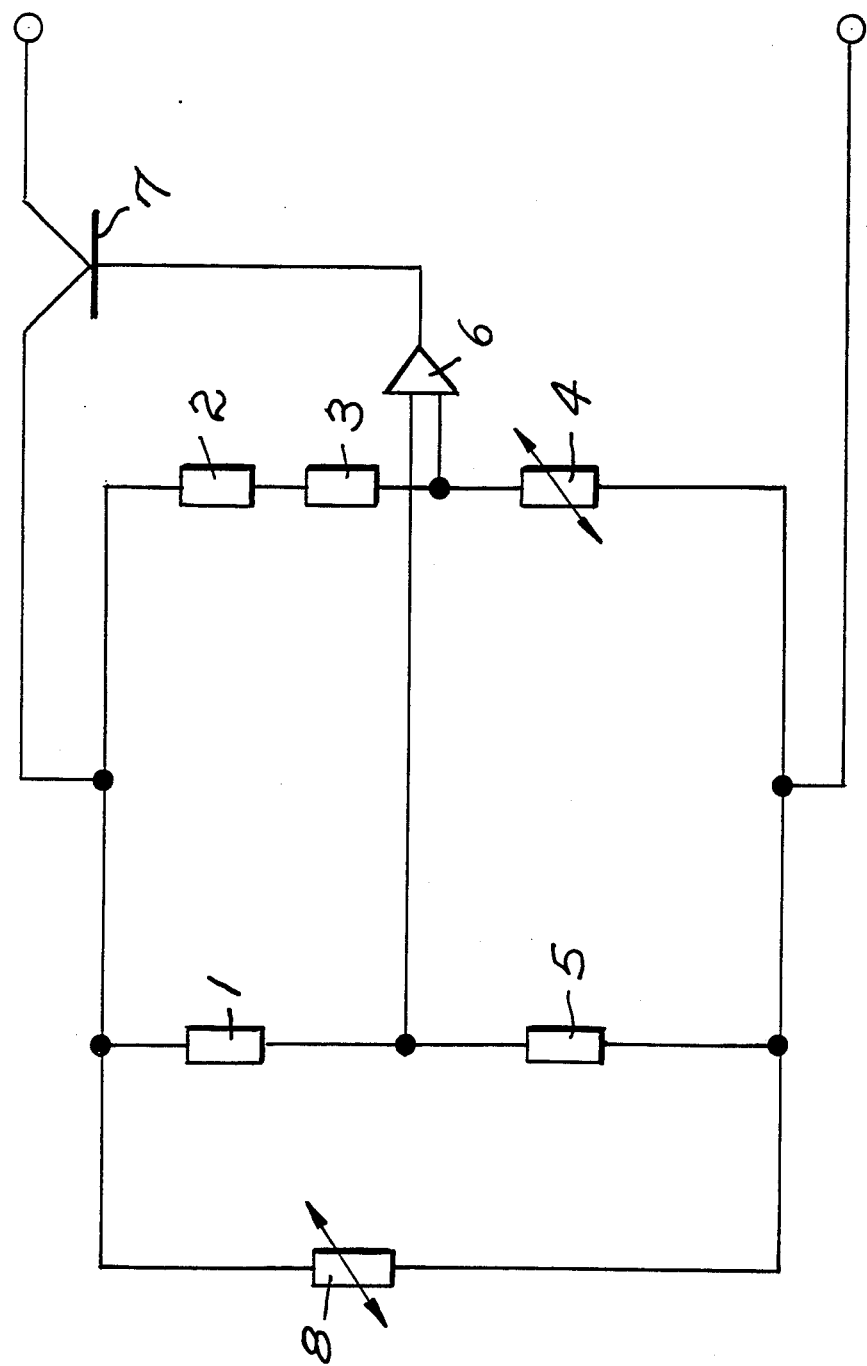

TEMPERATURE COMPENSATION FOR A THERMAL MASS FLOW METER

BACKGROUND OF THE INVENTION

1. Field of the Invention

The invention relates to temperature compensation of a thermal mass flow meter.

2. Description of the Prior Art

Thermal anemometers are used to measure the mass flow rate of a fluid, especially a gas at changing temperature. It is known to provide an anemometer having two temperature-dependent electric resistors, usually in the form of thin-film resistors or wires, connected together with two temperature-independent electric resistors, one of which is variable, in a bridge. An electric regulating circuit controls the operational voltage of the bridge in such a manner that one of the temperature-dependent resistors is electrically heated to a constant temperature that is in excess of the temperature of the unheated temperature-dependent resistor and of the temperature of the medium to be flow measured. This makes it possible to measure the mass flow of fluids fairly reliably even if the fluid temperature is changing. The change of the bridge current is a measure of the mass flow of the flowing fluid.

A thermal anemometer for measuring the mass flow of air with improved measuring accuracy is described in DE-OS No. 28 43 019 and in the publication "DISA-Information 22, 1977, pp. 5 to 14". The bridge contains, in addition to the two temperature-dependent electric resistors, three temperature-independent electric resistors, two of which are variable resistors. An excess temperature of the heated resistor in relation to the unheated temperature-dependent resistor is set with the one variable resistor $R_{UT}$ at a typical medium temperature. A difference in the temperature coefficients of the electric resistance of the two temperature-dependent electric resistors and a positive temperature dependency of the coefficient of heat transfer from the heated resistor to the fluid is compensated by using the other variable resistor $R_{TK}$, which can also be a resistance network. The temperature dependency of the excess temperature in relation to the medium temperature is varied with this electric resistor. The bridge current provides a measuring signal indicative of mass flow rate.

However, this known arrangement for temperature compensation has disadvantages. There is an unavoidable spread (difference) e.g. in temperature characteristics among various units of the temperaturedependent electric resistors used as sensors and in thermal conductivity of their respective holders. Therefore, the resistor $R_{TK}$ must be determined individually for each measuring device by measuring the temperature characteristic of the measuring signal in order to obtain exact temperature compensation. However, a change of resistor $R_{TK}$ necessarily changes the set excess temperature at a typical medium temperature, which must then be reset by changing the resistance value of $R_{UT}$. This balancing process must be performed several times, if necessary, and is quite time-consuming.

SUMMARY OF THE INVENTION

The present invention provides an arrangement for temperature compensating a thermal mass flow meter in a manner that requires as little time as possible. More specifically, it provides a mass flow meter arrangement in which two temperature-dependent resistors are in thermal contact with the flowing medium to be measured. One of the resistors is electrically heated and the other measures the temperature of the medium. The two temperature-dependent resistors are connected in circuit with three additional temperature independent resistors to form a bridge circuit. One of the three temperature independent resistors (4) is a variable resistor that is used to set an "excess" temperature of the heated resistor in relation to the temperature of the medium. A second (3) of the three temperature independent resistors has a fixed value and affects the temperature dependency of the bridge current. To the diagonal of the bridge circuit is connected a regulating circuit which includes a differential amplifier and a transistor.

An additional variable temperature-independent electric resistor (8) is coupled in circuit in parallel to the bridge. The sum of the current through the bridge and of the current through the additional resistor (8) connected in parallel to the bridge is used as measuring signal indicative of mass flow rate.

BRIEF DESCRIPTION OF THE DRAWINGS

The sole FIGURE is a schematic diagram of the temperature compensation arrangement according to the invention.

DETAILED DESCRIPTION OF THE PREFERRED EMBODIMENTS

The presently preferred embodiment of the invention is shown in schematic form in the sole FIGURE. The anemometer includes a heated temperature-dependent resistor 1 which is exposed to the cooling action of the flowing medium to be measured and an unheated temperature-dependent electric resistor 2 which is also in thermal contact with the flowing medium to be measured. Resistor 2 acts as a temperature sensing element. Resistors 1 and 2 are connected in circuit with three other resistors 3, 4, and 5, all of which are temperature-independent, to form a bridge circuit. The diagonal of the bridge is formed between a pair of nodes, the first node of which is between resistors 1 and 5, and the second node of which is between resistors 3 and 4. To the bridge diagonal is connected a control circuit which includes a differential amplifier 6 and a transistor 7 which controls the operational voltage of the bridge. Temperature independent resistor 4 is a variable resistor which is used to set an "excess" temperature of heated resistor 1 at a typical medium temperature. Resistor 3, which is not variable, affects the temperature coefficient of the bridge current.

An additional variable resistor 8 is placed in parallel with the bridge. The sum of the current through the bridge and through resistor 8 provides a measuring signal indicative of mass flow rate. Resistor 8 does not effect the excess temperature set by resistor 4. The current flowing through resistor 8 is a function of the resistance value of heated resistor 1 and therefore its temperature. Resistor 8 influences the temperature dependency of the measuring signal. A lowering of the resistance value of resistor 8 has qualitatively the same effect on the temperature dependancy of the signal as lowering the resistance value of resistor 3. This eliminates the need which would otherwise exist to reset of the excess temperature by adjusting resistor 4, thereby saving time.

The temperature compensation occurs in the following manner. The resistance value of resistor 3 is selected such that each bridge is overcompensated regardless of the differences between units of the sensors and of their respective holders. The desired excess temperature of the heater resistor at a typical medium temperature is set by adjusting the resistance value of variable resistor 4. The measurement of the temperature characteristic of the measuring signal determines the resistance value required for resistor 8 for temperature compensation. A resetting of the excess temperature is then no longer necessary, so that the time loss is considerably reduced.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A temperature compensated arrangement for measuring the mass flow rate of a fluid, comprising:
   first and second temperature-dependent resistors placed so as to be in thermal contact with the flowing medium to be measured, one of which first and second resistors is electrically heated, and the resistance value of the other of which provides an indication of its temperature, and hence the temperature of the fluid;
   third, fourth and fifth temperature-independent resistors, one of which is variable and used to set an excess temperature of the heated resistor in relation to the medium temperature, another of which affects the temperature dependency of a bridge current, the first through fifth resistors being coupled in so as to form a bridge circuit having a diagonal;
   a regulating circuit coupled to the diagonal of the bridge, the regulating circuit including a differential amplifier and a transistor;
   a sixth variable temperature independent resistor coupled in parallel with the bridge; the third resistor having a fixed value for affecting the temperature dependency of a bridge current; and
   means for measuring the sum of the current through the bridge and the current through the sixth resistor as a measuring signal indicative of mass flow rate.

2. A temperature compensated arrangement for measuring the mass flow rate of a fluid, comprising:
   a first temperature-dependent resistor that is electrically heated placed so as to be in thermal contact with the flowing medium to be measured and forming a first of four legs of a bridge circuit;
   a second temperature-dependent resistor, also placed in thermal contact with the flowing medium to be measured, the resistance value of which is related to its temperature, and hence the temperature of the fluid, said second resistor being in circuit in a second of the four legs of the bridge circuit;
   a third temperature-independent resistor having a fixed value in series circuit with said second resistor in the second leg of the bridge circuit for affecting the temperature dependency of a bridge current;
   a fourth variable temperature-independent resistor for setting an excess temperature of the heated resistor in relation to the medium temperature, the fourth resistor being in circuit in a third of the four legs of the bridge circuit;
   a fifth temperature-independent resistor in circuit in a fourth leg of the bridge circuit, the bridge circuit having a diagonal between first and second nodes thereof, the first node being at a junction of said first and fifth resistors and the second node being at a junction of said third and fourth resistors;
   a regulating circuit coupled to the diagonal of the bridge, the regulating circuit including a differential amplifier and a transistor;
   a sixth variable temperature independent resistor coupled in parallel with the bridge, such that it is coupled at one end thereof to said first resistor, and at the other end thereof to said fifth resistor; and
   means for measuring the sum of the current through the bridge and the current through the sixth resistor as a measuring signal indicative of mass flow rate.

* * * * *